(12) United States Patent
Lamotte et al.

(10) Patent No.: US 7,170,077 B2
(45) Date of Patent: Jan. 30, 2007

(54) BINDERLESS STORAGE PHOSPHOR SCREEN

(75) Inventors: Johan Lamotte, Rotselaar (BE); Jean-Pierre Tahon, Langdorp (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 8 days.

(21) Appl. No.: 11/222,511

(22) Filed: Sep. 8, 2005

(65) Prior Publication Data

US 2006/0076525 A1    Apr. 13, 2006

Related U.S. Application Data

(60) Provisional application No. 60/617,949, filed on Oct. 12, 2004.

(30) Foreign Application Priority Data

Oct. 7, 2004    (EP) .................... 04104909

(51) Int. Cl.
*H05B 33/00* (2006.01)
*C09K 11/62* (2006.01)

(52) U.S. Cl. .................... 250/580; 250/484.4

(58) Field of Classification Search ............ 250/580, 250/484.4, 581, 584
See application file for complete search history.

(56) References Cited

U.S. PATENT DOCUMENTS

| | | | |
|---|---|---|---|
| 3,859,527 A | 1/1975 | Luckey | 250/327 |
| 4,780,376 A | 10/1988 | Nakamura | 428/691 |
| 5,098,813 A * | 3/1992 | Nakano et al. | 430/139 |
| 5,474,708 A * | 12/1995 | Mori et al. | 252/301.4 H |
| 5,693,254 A * | 12/1997 | Sieber et al. | 252/301.4 H |
| 6,730,243 B2 | 5/2004 | Leblans et al. | 252/301.4 H |
| 7,018,789 B2 * | 3/2006 | Maezawa et al. | 430/496 |
| 7,053,385 B2 * | 5/2006 | Maezawa et al. | 250/484.4 |
| 2001/0007352 A1 | 7/2001 | Hell et al. | 250/484.4 |
| 2004/0094718 A1 | 5/2004 | Fuchs et al. | 251/362 |
| 2004/0104376 A1 | 6/2004 | Maezawa et al. | 252/301.4 H |
| 2004/0262535 A1 | 12/2004 | Leblans | 250/483.1 |

FOREIGN PATENT DOCUMENTS

| | | |
|---|---|---|
| DE | 10235057 | 2/2004 |
| EP | 1 113 458 | 7/2001 |
| WO | 01/03156 | 1/2001 |

OTHER PUBLICATIONS

EP 04 10 4909 European Search Report, 28une2005, Lehnert.
Patent Abstract of Japan, 2003270396, Konica Corp., Sep. 25, 2003.

* cited by examiner

*Primary Examiner*—Otilia Gabor
(74) *Attorney, Agent, or Firm*—Joseph T. Guy; Nexsen Pruet, LLC

(57) ABSTRACT

An image storage screen or panel, suitable for use in applications related with computed radiography comprises, on a support, a binderless needle-shaped stimulable CsBr:Eu phosphor layer, wherein, besides low amounts of a europium activator or dopant in favor of homogeneous distribution of said activator in the CsBr matrix, presence of well-defined amounts of rubidium halide and cesium chloride in said matrix, and, optionally, further presence of alkali metal, alkaline earth metal and/or metal earth salts, and/or, optionally, other metal salts or oxides, provides a remarkable speed increase, without loss in sharpness.

40 Claims, No Drawings

BINDERLESS STORAGE PHOSPHOR SCREEN

CROSS-REFERENCE TO RELATED PATENT APPLICATIONS

This application claims the benefit of U.S. Provisional Application No. 60/617,949 filed Oct. 12, 2004, which is incorporated by reference. In addition, this application claims the benefit of European Application No. 04104909.9 filed Oct. 07, 2004, which is also incorporated by reference.

FIELD OF THE INVENTION

The present invention relates to an improved CsBr:Eu-type photostimulable phosphor screen or panel, particularly suitable for use in radiographic image formation, offering a solution with respect to stringent demands for enhanced speed without loss in image definition in computed radiography (CR).

BACKGROUND OF THE INVENTION

In radiography it is important to have excellent image quality for the radiologist in order to make an accurate evaluation of a patient's condition. Important image quality aspects are image resolution and image signal-to-noise ratio (SNR).

In earlier technologies a combination in a screen/film arrangement of a prompt emitting luminescent phosphor screen together with a silver salt film was made, wherein the said film was made sensitive to ultraviolet, blue or green light, emitted by the luminescent phosphors after X-ray exposure through a patient.

A more recent technology, called "computed radiography" (CR) makes use, however, of absorption of captured X-rays and storage of the corresponding energy, transmitted through a patient, followed, in an electronic processing unit, by exciting the storage phosphor with energy (normally light in the red wavelength range emitted by a laser source) sufficient to release said stored energy by photostimulation by the said laser in form of visible light (normally in the blue wavelength range), wherein the released energy is read-out in a digital form, providing ability to reproduce and process an image and to enhance its diagnostic value. For this type of radiography, disclosed in basic patent U.S. Pat. No. 3,859,527 and called "computed radiography" (CR), the "signal-to-noise ratio" (SNR) depends on a number of factors.

The number of X-ray quanta absorbed by the storage phosphor screen is important therein as the SNR will be proportional to the square-root of the number of absorbed quanta. The so-called fluorescence noise, however, is of primary importance as well. This noise contribution originates from the fact that the number of photostimulated light (PSL) quanta detected for an absorbed X-ray quantum is small. Since much of the PSL is lost in the detection process in CR, fluorescence noise has an important contribution to the SNR. Hence, it is important that the number of photons detected per absorbed X-ray quantum is as high as possible. This situation is most critical e.g. in mammography, where X-ray quanta are used with low energy. Softer X-rays will give rise to less PSL centres and, therefore, to less PSL photons per absorbed X-ray quantum than harder X-rays. So in CR, a large number of PSL centres is created by an absorbed X-ray quantum. However, not all PSL centres are stimulated in the read-out process, because of the limited time available for pixel stimulation and because of the limited available laser power. Typically, only about 30% of the PSL centres is stimulated to give rise to a PSL photon. Since these photons are emitted and scattered in all directions, only 50% of the PSL photons escape from the storage phosphor screen at the detector side. Only a fraction of the PSL photons emitted at the top side of the storage phosphor screen is guided to the detector, which has a limited quantum efficiency itself. For that reason, the number of PSL photons detected per absorbed X-ray quantum is of the order of 1 to 5 and the fluorescence noise contribution is important in CR systems. In addition, it is well-known that fine detail visualisation, i.e. high-resolution high-contrast images are required for many X-ray medical imaging systems and, more particularly, in mammography. In phosphor screens, light scattering by the phosphor particles and their grain boundaries results in loss of spatial resolution and contrast in the image.

The number of PSL centres that is stimulated in the read-out process can be increased by reflecting the stimulating light at the bottom of the phosphor layer, i.e. by having a reflecting substrate. In this case the fraction of PSL centres that is stimulated will be higher than 30%. A reflecting substrate reflecting the PSL photons, thereby increasing the number that leaves the screen at the top side, provides a fraction to be higher than 50%. The combination of these effects may increase the number of PSL centres detected per absorbed X-ray quantum to a significant extent, thereby strongly improving the image SNR. However, when having a reflecting substrate, scattering is increased: the stimulating light spot is broadened when it is reflected at the screen substrate and spatial resolution is diminished. In powder CR screens, therefore, a reflective substrate is seldom used as such: it may, optionally, be used in combination with an anti-halation dye on top of it. The anti-halation dye, dedicated to absorb the stimulation light, thereby prevents its reflection and maintains high resolution. Anti-halation dyes however, although improving sharpness do not have the same influence on sensitivity of the CR plate, panel or screen.

Preparation steps in order to manufacture particularly useful screens or panels in favor of optimized speed increase combined with high definition (due to parallel aligned, vapor deposited phosphors in needle-shaped form) have been described in basic patent application WO 01/03156. In favor of image sharpness needle-shaped europium activated alkali metal halide phosphors, and more particularly, Eu-activated CsBr phosphor screens as described in US-Application 2001/007352 are preferred. In view of an improved sensitivity, annealing of said phosphors as in U.S. Pat. No. 6,730,243 is advantageously performed, said annealing step consisting of bringing the cooled deposited mixture as deposited on the substrate to a temperature between 80° C. and 220° C. and maintaining it at that temperature for between 10 minutes and 15 hours.

The high degree of crystallinity is easily analysed by X-ray diffraction techniques, providing a particular XRD-spectrum as has been illustrated in in US-Application 2001/007352. Therefore a mixture of CsBr and EuOBr or $EuBr_3$ is provided as a raw material mixture in the crucibles, wherein a ratio between both raw materials normally is more than 90% by weight of the cheap CsBr and less than 10% of the expensive EuOBr, both expressed as weight %.

A europium activated cesium bromide phosphor giving an increased stimulated emission, and which is also suitable for use in the screen or panel, has, besides low amounts, homogeneously incorporated amounts of europium dopant, minor or neglectable amounts of trivalent europium versus divalent europium, which is measurable from emission intensities of divalent and trivalent europium ions present. Preferably said emission intensities are differing with a factor of at least $10^3$, and more preferably even with a factor of $10^5$ to $10^6$ as has been set out in US-Application 2004/262535. Therein it has been shown that the more desired CsBr:Eu$^{2+}$ phosphor in binderless storage phosphor panels or screens having such a needle-shaped columnar phosphor layer should have an amount of europium dopant versus CsBr in the range between 100 and 400 p.p.m., and even, more preferably, in the range between 100 and 200 p.p.m. as is measurable e.g. by means of X-ray fluorescence. In the further disclosure hereinafter p.p.m. will always be understood in terms of "molar amount ratio". Incorporation of europium in minor amounts while making use of vapor deposition under reduced pressure and vacuum conditions has been shown therein to be favorable in order to reduce diffusion of the europium dopant and inhomogenous distribution of this main dopant, due to the quite severe heat vaporizing and depositing conditions. Said problem has also been treated in US-Application 2004/0104376, wherein it has been established that Eu as an activator element or dopant has properties that diffusion by heat is remarkable and that vapor pressure in a vacuum is high, so that there arises a problem that Eu is unevenly distributed in the main component because it is easily dispersed therein. Addition of Rubidium atoms to a photostimulable phosphor of the photostimulable phosphor layer so that a ratio of the Rb atoms to Cs atoms is 1/1,000,000 to 5/1,000 mol (corresponding with amounts in the range from 1 p.p.m. to 5,000 p.p.m.) is said therein to bring a solution in order to get high luminance, high sharpness and excellent durability. Much higher amounts of Rb versus Cs in the range from 150,000 to 2,000,000 p.p.m. were applied before as disclosed in U.S. Pat. No. 4,780,376.

On the other hand batches of raw materials may differ due to the presence of "impurities" like e.g. alkali metal salts such as sodium, potassium and/or rubidium salts, thereby giving rise in the end product to, at first sight, unexpected variations in speed. It is clear that there exists an ever lasting demand to further improve storage phosphor screens or panels from a point of view of a high and constant sensitivity and dopant homogeneity in order to provide ability to respond to the stringent demands with respect to high signal-to-noise ratio and definition of diagnostic images in computed radiography in general, and in mammography, in particular.

OBJECTS AND SUMMARY OF THE INVENTION

It is an object of present invention to produce a photostimulable phosphor of the europium activated cesium bromide type, providing homogeneously distributed dopant(s) in the phosphor needles, thereby further offering production ability of stable storage phosphor screens, plates or panels having improved speed homogeneity over the whole practically useful surface thereof.

It is another object of the present invention to offer a screen or panel that allows efficient creation and detection of photostimulated light (PSL), without leading to reduced resolution, i.e., to offer a CR screen that simultaneously provides high sensitivity and good resolution in a CR system.

Still another object is to provide a constant composition of phosphor, and homogenous distribution over the prepared phosphor with respect to the main europium dopant, as well as a constant amount of "impurities" which will further be called "co-dopants" in the detailed description.

It is a further object of the present invention to offer a screen or panel for CR applications and, more in particular, for applications related with mammography.

The above-mentioned advantageous effects have been realized by providing a storage phosphor according to the formulae as represented in the claims 1 and 2, and further by providing a screen or panel having the specific features set out in further claims. Specific features for preferred embodiments of the invention are set out in the claims dependent thereupon.

DETAILED DESCRIPTION OF THE INVENTION

As a particularly advantageous effect the phosphor having a composition in the screen or panel according to the present invention as disclosed herein, provides an unexpected high homogeneity of europium as a main activator or dopant for a low content or dopant concentration level of said europium in the CsBr matrix compound. This effect has been fully obtained by addition of further co-dopants, besides the main europium dopant, in order to get a constant composition of those "impurities", which should be considered now as particularly useful "co-dopants".

So in one embodiment, referring to absence of addition of chloride salts, a phosphor panel according to the present invention advantageously comprises a photostimulable phosphor according the formula (1)

$$CsBr_{(1-z-\alpha a)}.RbBr_z:aEu \qquad (1)$$

wherein $1\times10^{-4}$ mol/mol$<z<1.5\times10^{-1}$ mol/mol;

$0<a<2\times10^{-4}$ mol/mol and wherein $2\leq\alpha<3$.

In the formula (1) $\alpha$ depends on the relative amounts of the divalent and trivalent oxidation state wherein Eu ions are present.

In another embodiment a phosphor panel according to the present invention advantageously comprises a photostimulable phosphor according the formula (1) wherein $5\times10^{-3}$ mol/mol$<z<1.5\times10^{-1}$ mol/mol, wherein $0<a<5\times10^{-4}$ mol/mol and wherein $2\leq a<3$.

In still another embodiment a phosphor panel according to the present invention advantageously comprises a photostimulable phosphor according the formula (2)

$$Cs_{(1-z-\alpha a)}Rb_zBr_{(1-y)}Cl_y:aEu \qquad (2)$$

wherein $1\times10^{-4}$ mol/mol$<z<1.5\times10^{-1}$ mol/mol;

$6\times10^{-5}$ mol/mol$<y<1.5\times10^{-2}$ mol/mol;

$0<a<5\times10^{-4}$ mol/mol and wherein $2\leq\alpha<3$.

In a still further embodiment a phosphor panel according to the present invention advantageously comprises a photostimulable phosphor according the formula (2)

wherein $5\times10^{-3}$ mol/mol$<z<1.5-10^{-1}$ mol/mol;

$6\times10^{-5}$ mol/mol$<y<1.5\times10^{-2}$ mol/mol;

$0<a<1\times10^{-3}$ mol/mol and wherein $2\leq\alpha<3$.

It is thus not excluded to provide europium activator or dopant in amounts of more than 200 p.p.m. ("p.p.m." always to be read hereinafter as μmol per mol) to the phosphor, but the risk to get a less homogeneous profile and all problems as well known by anyone skilled in the art and as set forth in the background of the present invention is increasing.

However when europium is present in amounts, expressed in p.p.m. versus the CsBr matrix, in the range below 500 p.p.m., and, more particularly, in the range between 40 and 200 p.p.m., presence of rubidium chloride, bromide or chlorobromide salt(s) in an amount in the range between 100 and 150,000 p.p.m. in the CsBr main matrix compound makes speed of the phosphor, when coated in a panel, remarkably increase.

Moreover when europium is present in the low amounts in the CsBr matrix as set forth above, provided that chloride (e.g. when RbCl and/or CsCl salt(s) added thereto) is further present in an amount of more than 60 p.p.m., it allows use of lower amounts of Rb-salts in the range between 100 p.p.m. and 150,000 p.p.m., depending on the level of chloride content.

Limitations of europium dopant concentration may be less stringent in this case, wherein chloride ions are present indeed, but it is clear again that, in favor of homogeneously distributing the europium dopant in the phosphor, a low concentration (lower than 100 p.p.m., expressed as molar ratio amounts) is preferred.

In all cases mentioned above a sensitivity increase up to a level of more than 60% can be expected versus CsBr:Eu non-"co-doped" phosphors and instead of a variable and unpredictable speed between said such panels, an intentionally adapted addition of co-doping "impurities" is obtained.

As already set forth above the level of chloride is decisive for the desired amounts of rubidium, as it allows use of lower amounts of Rb-salts. A photostimulable phosphor panel according to the present invention may advantageously have chloride in a total amount in the vicinity of up to 15,000 p.p.m. In that case, wherein chloride is present, it is recommended to have amounts of rubidium salts (which may be rubidium chloride, rubidium bromide or a combination thereof) in molar amounts of the same order as chloride salts. A photostimulable phosphor panel according to the present invention, wherein chloride is present in an amount comparable with amounts of rubidium is thus desired.

The need and the advantages offered by the presence of chloride s becomes clear if phosphors are prepared from very pure CsBr (as e.g. the raw material, provided by CHEMETALL GmbH, Frankfurt a. Mainz, 60487 Germany) wherein no substantial amounts of chloride are present. Although presence of chloride ions in huge amounts, if compared e.g. with iodide ions, is allowable, it is recommended to add said amounts in the range of up to about 15,000 p.p.m. and even more preferably in the range between 60 to 2000 p.p.m., and even at most preferably from more than 100 up to 500 p.p.m. as lowest amounts should at least be higher than 60 p.p.m., and even more preferably, higher than 100 p.p.m..

In conditions wherein CsCl is added to the CsBr matrix, besides Rb-halides in the preferred amounts as set forth hereinbefore, even lower amounts of europium dopant are thus required, unexpectedly leading to even a higher speed, without impairing sharpness: amounts of less than 500 p.p.m., more preferably, in the range from 40 p.p.m. up to 200 p.p.m., and most preferably in the range from 45 p.p.m. up to 100 p.p.m. are preferred. Moreover incorporation of such lower amounts of europium dopant provide more homogeneous incorporation of that dopant, as envisaged in the objects of the present invention.

In a further preferred embodiment according to the present invention, it has been found that presence of metal compounds as of e.g. Ta, W, Ti or Mo is providing an extra speed increase. According to the present invention a photostimulable phosphor screen or panel according to the present invention additionally contains at least one compound comprising Ta, W, Ti or Mo in an amount of 10 p.p.m. to 1,000 p.p.m. (μmol/mol) versus CsBr in the phosphor.

A photostimulable phosphor panel according to the present invention, in one embodiment comprises a photostimulable phosphor according the formula (1')

$$CsBr_{(1-z-\alpha a-\beta x)}\cdot RbBr_z:aEu.xTa \qquad (1'),$$

wherein $1\times10^{-5}$ mol/mol$<x<1\times10^{-4}$ mol/mol $1\times10^{-4}$ mol/mol$<z<1.5\times10^{-1}$ mol/mol;

$0<a<0.2$ mol/mol;

and wherein $2\leq\alpha<3$ and $2<\beta\leq5$.

In the formula (1') β depends on the relative amounts of the differing oxidation states wherein Ta ions are present, ranging between 2 as lowest and 5 as highest oxidation state.

A photostimulable phosphor panel according to the present invention, in another embodiment comprises a photostimulable phosphor according the formula (2')

$$Cs_{(1-z-\alpha a-\beta x)}Rb_zBr_{(1-y)}Cl_y:aEu.xTa \qquad (2'),$$

wherein $1\times10^{-5}$ mol/mol$<x<1\times10^{-4}$ mol/mol;

$6\times10^{-5}$ mol/mol$<y<1.5\times10^{-2}$ mol/mol;

$1\times10^{-4}$ mol/mol$<z<1.5\times10^{-1}$ mol/mol;

$0<a<0.2$ mol/mol; and wherein $2\leq\alpha<3$ and $2<\beta\leq5$.

Accordingly in the photostimulable phosphor panel according to to the present invention, said phosphor additionally contains Ta in a preferred amount from more than 10 p.p.m. up to 50 p.p.m. versus CsBr, and even more preferably in an amount from more than 10 p.p.m. to 30 p.p.m. versus said CsBr.

In a photostimulable phosphor panel according to the present invention, metals selected from the group consisting of Li, Na, K, Tl, Ca, Ba, Pb, Ni, Cr, Cu, Fe and Bi are (optionally) present in addition to the stimulable phosphor according to anyone of the formulae (1), (1'), (2) and (2') as presented above, provided with the activator dopant and "co-dopants" in amounts therein as set forth hereinbefore. Na, K, Ca and Pb are most frequently effectively analytically detected therein in excess to their "natural impurity level" after addition in minor amounts thereof.

In a photostimulable phosphor panel according to the present invention, potassium is preferably present in amounts of less than 100 p.p.m. versus CsBr in the photostimulable phosphor according to anyone of the formulae (1), (1'), (2) and (2') provided with the europium activator dopant and the other "co-dopants" in amounts therein as set forth hereinbefore.

In a photostimulable phosphor panel according to the present invention phosphor, in favor of homogeneously divided dopants over each crystal, compositions are present as represented in any of the the formulae (1), (1'), (2) and (2'), wherein europium is, in a preferred embodiment, present in an amount in the range from 40 to 200 p.p.m. versus CsBr, more preferably in the range from 40 to 100 p.p.m. versus CsBr, and still more preferably in the range from 45 to 75 p.p.m.

The advantages such as high sensitivity and homogeneous dopant distribution that are detected in a stimulable phosphor screen are not only observed when said phosphor is vapor deposited, as a binderless needle-shaped layer onto a suitable support, from raw materials as CsBr (as main component or matrix component) and EuOBr (as a main dopant or activator), together with the "co-dopants" set forth hereinbefore (as e.g. the predetermined—not "non-intended impurities"—and preferred amounts of rubidium, chlorides, tantalum and potassium). An analoguous speed increase is found back when such needles are ground and coated in a binder material as a layer, coated onto a support in order to provide a suitable stimulable or storage phosphor screen or panel.

As set forth above, a suitable raw material as europium dopant precursor is EuOBr, wherein europium is trivalent. After vapor deposition however, trivalent europium is present in the phosphor as divalent europium in substantially excessive amounts versus said trivalent europium.

So in a photostimulable phosphor panel according to the present invention, europium is present in divalent and trivalent form in a ratio between divalent and trivalent europium of at least $10^1:1$, and, in a more preferred embodiment, of even at least $10^3:1$.

In the present invention preparation methods of the desired CsBr:Eu phosphors are, starting e.g. from CsBr and EuOBr as described in U.S. Pat. No. 6,802,991, wherefrom as a preferred method for manufacturing a binderless phosphor screen, a method has been selected as bringing heatable multiple containers of CsBr and an Europium compound selected from the group consisting of EuX'2 EuX'3 and EuOX', X' being selected from the group consisting of Cl (if required in desired co-doping amounts) and Br together with the substrate in a deposition chamber that is evacuated to at least less than $10^{-1}$ mbar; and depositing, by a method selected from the group consisting of physical vapor deposition, chemical vapor deposition or atomization techniques, both said CsBr and said Europium compound on a substrate in such a ratio that on said substrate a CsBr phosphor, doped with low amounts in order to get a screen having amounts of Europium of less than 100 p.p.m. is present.

In another embodiment the preparation method for producing CsBr:Eu stimulable phosphors and screens or panels provided with said phosphors as vapor deposited needle-shaped phosphors suitable for use in image forming methods for recording and reproducing images of objects made by high energy radiation, is performed in an atmosphere essentially free from oxygen in order to avoid oxygen in the crystal structure of the CsBr:Eu, and wherein the method comprises the steps of mixing CsBr with a compound or combinations of compounds having as a composition $Cs_xEu_yX''_{x'+\sigma y'}$, wherein the ratio of x' to y' exceeds a value of 0.25, wherein $\sigma \geq 2$ and wherein X' is Br or Cl or a combination thereof; heating said mixture at a temperature above 450° C.; cooling said mixture, and optionally annealing and recovering said CsBr:Eu phosphor according to a selected method disclosed in EP-A 1 568 752.

Alternatively as starting compounds, said compounds having as a composition $Cs_xEu_yX''_{x'+\sigma y'}$, set forth above, without mixing those dedicated precursors with CsBr, are advantageously applied in the preparation method of a screen or panel according to the present invention, according to a selected method disclosed in EP-A 1 568 751.

Examples of such compounds are $CsEu_4Br_9$, $CsEu_2Br_5$, $CsEuBr_3$, $Cs_2EuBr_4$ and $Cs_3EuBr_5$.

A photostimulable phosphor panel according to the present invention, in its most preferred application, is a radiographic image storage panel comprising a support and a vapor deposited binderless photostimulable phosphor layer thereupon. The phosphor is most advantageously deposited by physical vapor deposition on said substrate while, during deposition, said substrate is at a temperature in the range of 135° C. to 235° C., wherein a variation of that substrate temperature during said deposition process is not more than 50° C. as has been disclosed in US-Application 2004/0081750.

A photostimulable phosphor panel according to the present invention is, in a preferred embodiment, a screen or panel wherein said binderless layer has parallel aligned needle-shaped phosphors and has a thickness of less than 1000 µm.

A photostimulable phosphor panel according to the present invention, especially in more particular applications as e.g. mammography, is a screen or panel wherein said binderless layer has parallel aligned needle-shaped phosphors and has a thickness in the range from 100 µm to 700 µm.

It is well known that needle-shaped crystals act, to a certain extent, as light guides, thereby reducing lateral spread of stimulation and emission light in the phosphor layer. The dimensions of those crystals are in the range of as disclosed in US-Application 2003/0189179: needle-shaped CsBr:Eu storage phosphor crystal particles in form of a cylinder suitable for use in flat storage phosphor panels have been provided, said particles having an average cross-section in the range from 1 µm up to 30 µm and an average length, measured along the casing of said cylinder, in the range from 100 µm up to 1000 µm. Such a cylindrical shape of the parallel aligned phosphor needles in a photostimulable phosphor layer should avoid transversal diffusion of stimulating excitation light and should render the photostimulable phosphor layer columnar, so that the light reaches the support surface while repeating reflection in a crack or columnar crystal interface, thereby noticeably increasing the sharpness of images formed by stimulated emission radiation.

In a preferred embodiment a photostimulable phosphor panel according to the present invention is provided with a reflecting support. As such a reflecting support reflects stimulation radiation and stimulated radiation, it is clear that an enhanced speed is obtained in this particular application wherein speed is highly desired. Choice of a dedicated reflecting layer onto said support in order to reduce scattering to a minimum level in favor of image definition is recommended. In the present invention therefore a substrate characterized by a surface roughness of less than 2 µm and a reflectivity of more than 80%, more preferably more than 90% and even more than 95% as set forth in US-Application 2004/0262537 is particularly recommended.

A highly reflecting metal layer (more particularly, a highly reflecting aluminum or silver layer) on e.g. an aluminum support or an amorphous carbon layer support (as disclosed in US-Application 2004/0262535, without however being limitative as an example of a supporting layer), are particularly suitable in mammographic applications. As a thin reflective mirror layer a metallic layer is preferably used, like e.g. silver mirror or, more preferably, an aluminum layer (having a thickness of about 1 µm), deposited onto an about 2 mm thick support layer (e.g. amorphous carbon—a-C layer, another aluminum sheet or a polymeric support layer). Most commonly used is an aluminum layer, deposited by means of the vapor deposition technique, having as an additional advantage that it exhibits thermal conductivity. As taught in US-Application 2004/0081750, in one embodiment thereof, the phosphor is deposited by physical vapor deposition on said substrate characterized in that during deposition said substrate is at a temperature in the range of 135° C. to 235° C., wherein a variation of the temperature of the substrate occurring during said deposition process is not more than 50° C. At lower temperatures as e.g. in the range from 50° C. to 150° C. the said thermal conductivity may become even more important as for the support temperature there is a tendency that the thickness of the phosphor layer is decreased when the temperature is more lowered during vapor deposition of the phosphor layer, providing an increased number of needle-shaped crystals per square unit. Polymeric support films known in the art may be used as main support layer as, e.g., polyester film, polyvinylchloride, polycarbonate, and syntactic polystyrene, without however being limited thereto. Preferred polymeric films are polyester ester film, such as e.g., polyethyleneterephthalate films, polyethylenenaphthalate films. Besides the support support auxiliary layers may be present, the thickness of which in principle ranges from 1 μm to 500 μm. It may be advantageous to have a support including a composite material of a matrix resin and a carbon fiber, and a heat resistant resin film provided on a face of the substrate. As a glass-transition temperature of the matrix resin a temperature of not less than 100° C. and not more than 300° C. may be preferable. Such a support may thus comprise a plurality of layers of two or more kinds. As an example thereof, without however being limited thereto the support may e.g. comprise a carbon reinforced layer package, having, in order, a first polyimide layer, a carbon fiber layer and a second polyimide layer. A plurality of carbon fiber reinforced resin sheets, each of which including carbon fibers arranged in a direction and impregnated with a heat resistant resin, may be present and directions of the carbon fibers in the carbon fiber reinforced resin sheets may be the same, but may differ from each other and may be arranged at approximately equal angles. Instead of the cited polymeric film supports, it is however possible to make use of a fairly thin amorphous carbon film, e.g., 400 μm. A laminate of a 500 μm thick auxiliary film may be applied to it at the side away from the phosphor layer. It is also possible to use a thick amorphous carbon film, e.g., 2000 μm thick with a thin, e.g., 6 μm thick, polymeric film laminated onto it. The relative thickness of amorphous carbon and polymeric film may be varied widely and is only directed by the required physical strength of the amorphous carbon during deposition of the phosphor layer and the required flexibility of the panel during use. Alternatively the support may even comprise at least one selected from the group consisting of chemically reinforced glass and crystallized glass.

In favor of sharpness the panels are advantageously provided with colored, nanocrystalline dyes in the phosphor layer, e.g. as disclosed in US-Application 2003/0183777, although colored supports, absorbing at least 30% of the stimulating light and reflecting at least 60% of the stimulated emission light as in US-Application 2003/0134087 are advantageously applied too.

More particular coating or manufacturing methods within a sealed zone maintained under vacuum conditions, by the step of vapor deposition, wherein said phosphor layer is, continuously or discontinuously, deposited onto a substrate, and wherein said substrate is deformed at least before, during or after said step of vapor deposition, in order to provide the manufacturer, by a process of exceptionnally high yield, with large deposited phosphor sheets having constant speed and image quality properties, further offering availablity of all formats as desired for screens, plates or panels ready-for-use in a scanning apparatus in computed radiography, have been disclosed in EP-A 1 460 642.

In a method for homogeneously and dust-free coating of a phosphor layer onto a flexible substrate, in order to obtain a plurality of phosphor sheets or panels having flexible supports or substrates, a coating procedure within a sealed zone is performed, wherein said zone comprises at least two cylindrical carrier rollers for carrying a flexible substrate exceeding dimensional formats of desired phosphor sheets or panels with a factor of at least 5, wherein said cylindrical carrier rollers each have an axis in a parallel arrangement with one another; wherein said zone comprises at least one crucible containing a mixture of raw materials providing desired phosphor compositions for said layer; and wherein is said zone comprises a laminating unit; wherein said method comprises the steps of mounting said flexible substrate onto said carrier rollers, vapor depositing said phosphor layer having a desired phosphor composition onto said flexible substrate, and laminating said phosphor layer, thereby covering said layer with a protective foil; further comprising the step of cutting said layer into sheets or panels having desired formats, and wherein at least during said vapor depositing step said zone is maintained under vacuum conditions as a vacuum chamber, has been published as US-Application 2004/0224084.

Improvements in crucible configurations for evaporating raw materials as set forth can succesfully be applied by making use of an assembly as described in US-Applications 2005/0000411 and 2005/0000448.

Once deposited in a layer, the CsBr:Eu type phosphors, that are very sensitive to moisture, are advantageously protected against the said moisture by applying a layer of the preferred parylene type polymers as disclosed in relation with CsBr:Eu type phosphor panels e.g. in U.S. Pat. No. 6,710,356 and in EP-A's 1 286 362, 1 286 363 and 1 286 365. A protective organic film vapor deposition method for parylene films c an be applied as described in U.S. Pat. No. 2001/030291. Other preferred protections, e.g. for the protective layer applied onto the phosphor layer and providing protection against scratches as described in US-Applications 2004/0164251, 2004/0228963 and 2005/0067584.

As a global result, apart from the vacuum deposition layer forming conditions onto the support, it has thus been found to be particularly advantageous, in one embodiment, to make use of europium dopants in amounts versus CsBr as a matrix compound, in the range below 500 p.p.m., and more preferably, in the range from 40–200 p.p.m., provided that besides europium as a main dopant, at least a Rb salts in an amount between 5,000 p.p.m. and 150,000 is p.p.m. should be present in the absence of Cl.

In the intended presence of chloride ions however, in an amount in the range from 60 p.p.m. to 10,000 p.p.m., lower amounts of rubidium are required, and the more if the range of chloride is within 100 p.p.m. and 20,000 p.p.m., which requires not more than in the range from 100 p.p.m. to 20,000 p.p.m. of rubidium.

Higher amounts of europium, laying burden on a high homogeneity of europium distribution in the phosphor needles however, also requires higher amounts of rubidium, i.a. in the range of from 100 p.p.m. up to 150,000 p.p.m. and more preferably in the range from 5,000 to 150,000 p.p.m., even in the presence of chloride.

The present invention thus provides an interesting tool with respect to overcome variations of "impurities" in raw materials used in the preparation of storage phosphors and storage phosphor panels and in favor of homogeneous europium dopant or activator distribution over the phosphor volume and in the depth of the deposited phosphor layer: a molar ratio at least 9/10, and even more than 95/100 when amounts of europium as main activitor or dopant is measured on top of the phosphor layer and at the bottom (near the support) clearly illustrates the superior homogeneity distribution of the main dopant!

EXAMPLES

While the present invention will hereinafter be described in connection with preferred embodiments thereof, it will be understood that it is not intended to limit the invention to those embodiments.

Experiments were performed with low chloride amounts (Experiments in Table 1) and low rubidium amounts (Experiments in Table 2) in powder mixtures prepared before starting evaporation.

Needle-shaped phosphors were prepared by a vapor deposition process in an Argon atmosphere at 710° C. on an anodized aluminum support. 530 g CsBr powder and EuOBr (less than 10 wt % versus the total amount used) were mixed and added to a tantalum crucible in a vapor deposition apparatus (crucible temperature 710° C. while evaporating; support temperature held at 155±10° C.). The needle-shaped phosphor layer was annealed during 4 hours at 170° C. Sensitivity was measured, referring to a reference sample MD10 (after X-ray exposure, photostimulation and read-out in a SOLO® digitizer).

Results obtained when intentionally adding well-known amounts of Rb and/or Cl and or metal compounds (like e.g. Ta-compounds) in the vapor deposition preparation step of the desired CsBr:Eu phosphor have been summarized in the Tables 1 and 2.

Speed of the screens was compared with the reference speed of an MD10® reference screen manufactured by Agfa-Gevaert, Mortsel, Belgium, and corrected for phosphor layer absorption, based on absorption measurements.

Table 1 is illustrative for results obtained in conditions of low chloride amounts. In the range between less than 40 p.p.m. and 83 p.p.m. as an experiment wherein the highest chloride concentration was found in the needle image plate—NIP—, addition of low rubidium salt amounts (less than 45 p.p.m.–1 p.p.m., being present as an "impurity"), does not lead to a speed increase. When rubidium amounts are added, however (range between 100 and 200 p.p.m. as in Experiment CB71214) even with a low europium activator content in the range between 60 and about 80 p.p.m. (71 p.p.m. found back in that panel) after correction for layer thickness, a "corrected" speed value of "366" is obtained (reference screen CB71707: 272). Such a speed increase was also attained by addition of higher rubidium amounts in the absence of chloride (see CB71713)!

Table 2 moreover confirms speed enhancement in the presence of chloride as in Table 1, provided that chloride is not present in too high an amount (i.e. not exceeding 15,000 p.p.m.), wherein a high speed at 10,000 p.p.m. Cl suggests an influence of higher amounts of tantalum (Mo, not found when present as crucible material) and potassium, present as "unexpected dopants" instead of mere "impurities". Addition of chloride in high amounts thus asks for low rubidium salt additions, in favor of speed, and permits low europium activator dopant to get homogeneously distributed over the crystal volume. Addition of chloride in lower amounts however asks for higher rubidium salt additions (more than 100 p.p.m.), in order to get a comparable speed for the needle image plate, further leaving the low europium activator dopant to become homogeneously distributed over the crystal volume as well.

Table 3 leads to the conclusion that simultaneous presence of dopant amounts of Rb and of Cl in comparable amounts not exceeding 15,000 p.p.m., even for amounts of Eu of less than 100 p.p.m., provides excellent speed. Presence of tantalum and potassium may moreover be favorable.

As can be concluded from the experimental data summarized in the Tables 1 to 3 presented hereinafter, simultaneous presence of rubidium and chloride ions in the CsBr matrix provides excellent results with respect to speed (sensitivity), without impairing sharpness (see Table 4), and moreover allows a more homogeneous distribution of the lower amounts of europium required in order to attain the said speed and sharpness.

From further experiments with high rubidium salt amounts (more than 150,000 p.p.m.) however, added together with high chloride amounts (more than 100,000 p.p.m.) it has been learnt that this leads to uncertain results and irreproducible speed, opposite to the condition wherein high chloride and low rubidium amounts are used.

Presence of Ta and/or K or Ba in amounts as set forth does not impair these results, but at least provides the same or slightly better speed and/or sharpness.

Having described in detail preferred embodiments of the current invention, it will now be apparent to those skilled in the art that numerous modifications can be made therein without departing from the scope of the invention as defined in the appending claims.

TABLE 1

| Exp. No. | Dopant[1] (ppm Rb$^+$) | Dopant[2] (ppm Rb$^+$) | Ta | Eu | Coating weight (mg/cm$^2$) | Thickness (μm) | Sensitivity[1] | ppm Cl |
|---|---|---|---|---|---|---|---|---|
| CB71709 | 50 | 45 | 24 | 66 | 81.6 | 227.6 | 239 | <40 |
| CB71713 | 10000 | 8130 | 23 | 62 | 76.4 | 215.1 | 308 | <40 |
| CB71707 | 0 | 0.5 | <20 | 82 | 78.8 | 219.2 | 272 | <40 |
| CB71714 | 20000 | 16000 | <20 | 75 | 74.9 | 212.6 | 319 | <40 |
| CB71202 | <20 | <20 | ? | 69 | 85.1 | 235.4 | 270 | <80 |
| CB71214 | >100 | 149 | ? | 71 | 86.8 | 239.6 | 366 | 83 |

Dopant[1]: expected amount of Rb-dopant, expressed in p.p.m..
Dopant[2]: effectively detected amount of Rb-dopant, expressed in p.p.m..
Sensitivity[1]: speed corrected theoretically for absorption (measured on MD10 ® reference screen).

TABLE 2

| Exp. No. | ppm Rb in NIP ** | ppm Cl in powder | ppm Cl in NIP *** | Coating weight (mg/cm$^2$) | ppm Eu | Sensitivity$^2$ | Sensitivity$^3$ | Ta ppm | K ppm |
|---|---|---|---|---|---|---|---|---|---|
| CB71708 |  | <40 | <40 | 73 | ? | 154 | 249 |  |  |
| CB71834 | <20 | 5 | 58 | 71.4 | 77 | 161.6 | 264.6 | 18 | 24 |
| CB71818 | <20 | 10 | 45 | 79.99 | 63 | 204.2 | 311.3 | 32 | 47 |
| CB71815 | <20 | 144–158 * | 158 | 82.03 | 72 | 224.7 | 337.1 | 21 | 59 |
| CB71816 | <20 | 264–275 * | 274 | 83.2 | 57 | 212.1 | 315.4 | 25 | 67 |
| CB71819 | <20 | 3000 | 3280 | 82.39 | 57 | 209.5 | 313.4 | 45 | 77 |
| CB71820 | <20 | 10000 | 9310 | 83.9 | 59 | 259.5 | 383.9 | 42 | 82 |
| CB71821 | <20 | 20000 | 29050 | 81.91 | 47 | 194.1 | 291.4 | 46 | 85 |

Sensitivity$^2$: speed compared with MD10 ® reference screen.
Sensitivity$^3$: speed corrected theoretically for absorption (measured on MD10 ® reference screen)
* analysis of raw material;
** optical emission spectroscopy;
*** ion chromatography

TABLE 3 *

| Exp. No. | ppm Rb in screen ** | ppm Cl in screen *** | Coating weight (mg/cm$^2$) | ppm Eu | Sensitivity$^4$ | Sensitivity$^5$ | Ta ppm | K ppm |
|---|---|---|---|---|---|---|---|---|
| CB71834 | <20 | 58 | 71.40 | 77 | 161.6 | 264.6 | 18 | 24 |
| CB71830 | 115 | 168 | 87.14 | 89 | 256.5 | 370.6 | 22 | 88 |
| CB71831 | 283 | 308 | 86.32 | 85 | 199.9 | 290.5 | 25 | 91 |
| CB71832 | 2290 | 2700 | 82.84 | 60 | 249 | 371.4 | 25 | 74 |
| CB71833 | 7950 | 8830 | 78.05 | 55 | 215.6 | 333.9 | 32 | 92 |

* all experiments have been performed in a tantalum crucible
** optical emission spectroscopy;
*** ion chromatography
Sensitivity$^4$: speed compared with MD10 ® reference screen.
Sensitivity$^5$: speed corrected theoretically for absorption (measured on MD10 ® reference screen).

TABLE 4 *

| Exp. No. | ppm Rb in screen ** | ppm Cl in screen *** | ppm Eu | Sensitivity$^5$ | Rel. MTF (1 lp/mm) | Rel. MTF (3 lp/mm) | Ta ppm | K ppm |
|---|---|---|---|---|---|---|---|---|
| CB71707 | 0 | 0 | 82 | 272 | 129.6 | 218.2 | <20 | ? |
| CB71713 | 10000 | 8130 | 62 | 308 | 129.3 | 214.3 | 23 | ? |
| CB71714 | 20000 | 16000 | 75 | 319 | 129.8 | 209.8 | <20 | ? |
| CB71815 | <20 | 158 | 72 | 337.1 | 129.7 | 217.7 | 21 | 59 |
| CB71825 | <20 | 150 | 84 | 410 | 130.4 | 227.6 | <20 | 70 |
| CB71834 | <20 | 58 | 77 | 264.6 | 130.8 | 264.3 | 18 | 24 |
| CB71830 | 115 | 168 | 89 | 370.6 | 126.3 | 214.9 | 22 | 88 |
| CB71832 | 2290 | 2700 | 60 | 371.4 | 126.9 | 206.5 | 25 | 74 |

* all experiments have been performed in a tantalum crucible
** optical emission spectroscopy;
*** ion chromatography
Sensitivity$^5$: speed corrected theoretically for absorption (measured on MD10 ® reference screen).
Rel. MTF: % sharpness at 1 and 3 line pairs per mm respectively.

The invention claimed is:

1. A photostimulable phosphor panel comprising a photostimulable phosphor according to the formula (1)

$$CsBr_{(1-z-\alpha a)}.RbBr_z:aEu \quad (1),$$

wherein $5 \times 10^{-3}$ mol/mol$<z<1.5 \times 10^{-1}$ mol/mol, $0<a<5 \times 10^{-4}$ mol/mol and wherein $2 \leq \alpha < 3$.

2. A photostimulable phosphor panel according to claim 1, wherein in the formula (1)

$1 \times 10^{-4}$ mol/mol$<z<1.5 \times 10^{-1}$ mol/mol and wherein $0<a<2 \times 10^{-4}$ mol/mol.

3. A photostimulable phosphor panel according to claim 2, wherein said phosphor additionally contains at least one compound comprising Ta, W, Ti or Mo in an amount of 10 p.p.m. to 1,000 p.p.m. (µmol/mol) versus CsBr.

4. A photostimulable phosphor panel according to claim 3, wherein metals selected from the group consisting of Li, Na, K, Tl, Ca, Ba, Pb, Ni, Cr, Cu, Fe and Bi are additionally present.

5. A photostimulable phosphor panel according to claim 3, wherein europium is present in an amount in the range between 40 and 500 p.p.m. (µmol/mol) vs. CsBr.

6. A photostimulable phosphor panel according to claim 3, wherein europium is present in an amount in the range between 40 and 200 p.p.m. (µmol/mol) vs. CsBr.

7. A photostimulable phosphor panel according to claim 2, wherein metals selected from the group consisting of Li, Na, K, Tl, Ca, Ba, Pb, Ni, Cr, Cu, Fe and Bi are additionally present.

8. A photostimulable phosphor panel according to claim 2, wherein in the formula (1) europium is present in an amount in the range between 40 and 500 p.p.m. (μmol/mol) vs. CsBr.

9. A photostimulable phosphor panel according to claim 2, wherein in the formula (1) europium is present in an amount in the range between 40 and 200 p.p.m. (μmol/mol) vs. CsBr.

10. A photostimulable phosphor panel according to claim 1, wherein said phosphor additionally contains at least one compound comprising Ta, W, Ti or Mo in an amount of 10 p.p.m. to 1,000 p.p.m. (μmol/mol) versus CsBr.

11. A photostimulable phosphor panel according to claim 10, wherein metals selected from the group consisting of Li, Na, K, Tl, Ca, Ba, Pb, Ni, Cr, Cu, Fe and Bi are additionally present.

12. A photostimulable phosphor panel according to claim 10, wherein europium is present in an amount in the range between 40 and 500 p.p.m. (μmol/mol) vs. CsBr.

13. A photostimulable phosphor panel according to claim 10, wherein europium is present in an amount in the range between 40 and 200 p.p.m. (μmol/mol) vs. CsBr.

14. A photostimulable phosphor panel according to claim 1, wherein metals selected from the group consisting of Li, Na, K, Tl, Ca, Ba, Pb, Ni, Cr, Cu, Fe and Bi are additionally present.

15. A photostimulable phosphor panel according to claim 1, wherein in the formula (1) europium is present in an amount in the range between 40 and 500 p.p.m. (μmol/mol) vs. CsBr.

16. A photostimulable phosphor panel according to claim 1, wherein in the formula (1) europium is present in an amount in the range between 40 and 200 p.p.m. (μmol/mol) vs. CsBr.

17. A photostimulable phosphor panel comprising a photostimulable phosphor according the formula (2)

$$Cs_{(1-z-\alpha a)}Rb_zBr_{(1-y)}Cl_y:aEu \qquad (2)$$

wherein $5\times10^{-3}$ mol/mol$<z<1.5\times10^{-1}$ mol/mol;

$6\times10^{-5}$ mol/mol$<y<1.5\times10^{-2}$ mol/mol;

$0<a<1\times10^{-3}$ mol/mol and wherein $2\leq\alpha<3$.

18. A photostimulable phosphor panel according to claim 17, wherein in the formula (2)

$1\times10^{-4}$ mol/mol$<z<1.5\times10^{-1}$ mol/mol and wherein $0<a<5\times10^{-4}$ mol/mol.

19. A photostimulable phosphor panel according to claim 18, wherein said phosphor additionally contains at least one compound comprising Ta, W, Ti or Mo in an amount of 10 p.p.m. to 1,000 p.p.m. (μmol/mol) versus CsBr.

20. A photostimulable phosphor panel according to claim 19, wherein metals selected from the group consisting of Li, Na, K, Tl, Ca, Ba, Pb, Ni, Cr, Cu, Fe and Bi are additionally present.

21. A photostimulable phosphor panel according to claim 19, wherein europium is present in an amount in the range between 40 and 500 p.p.m. (μmol/mol) vs. CsBr.

22. A photostimulable phosphor panel according to claim 19, wherein europium is present in an amount in the range between 40 and 200 p.p.m. (μmol/mol) vs. CsBr.

23. A photostimulable phosphor panel according to claim 18, wherein metals selected from the group consisting of Li, Na, K, Tl, Ca, Ba, Pb, Ni, Cr, Cu, Fe and Bi are additionally present.

24. A photostimulable phosphor panel according to claim 18, wherein in the formula (2) europium is present in an amount in the range between 40 and 500 p.p.m. (μmol/mol) vs. CsBr.

25. A photostimulable phosphor panel according to claim 18, wherein in the formula (2) europium is present in an amount in the range between 40 and 200 p.p.m. (μmol/mol) vs. CsBr.

26. A photostimulable phosphor panel according to claim 17, wherein said phosphor additionally contains at least one compound comprising Ta, W, Ti or Mo in an amount of 10 p.p.m. to 1,000 p.p.m. (μmol/mol) versus CsBr.

27. A photostimulable phosphor panel according to claim 26, wherein metals selected from the group consisting of Li, Na, K, Tl, Ca, Ba, Pb, Ni, Cr, Cu, Fe and Bi are additionally present.

28. A photostimulable phosphor panel according to claim 26, wherein europium is present in an amount in the range between 40 and 500 p.p.m. (μmol/mol) vs. CsBr.

29. A photostimulable phosphor panel according to claim 26, wherein europium is present in an amount in the range between 40 and 200 p.p.m. (μmol/mol) vs. CsBr.

30. A photostimulable phosphor panel according to claim 17, wherein metals selected from the group consisting of Li, Na, K, Tl, Ca, Ba, Pb, Ni, Cr, Cu, Fe and Bi are additionally present.

31. A photostimulable phosphor panel according to claim 17, wherein in the formula (2) europium is present in an amount in the range between 40 and 500 p.p.m. (μmol/mol) vs. CsBr.

32. A photostimulable phosphor panel according to claim 17, wherein in the formula (2) europium is present in an amount in the range between 40 and 200 p.p.m. (μmol/mol) vs. CsBr.

33. A photostimulable phosphor panel comprising a photostimulable phosphor according the formula (1')

$$CsBr_{(1-z-\alpha a-\beta x)}.RbBr_z:aEu.xTa \qquad (1'),$$

wherein $1\times10^{-5}$ mol/mol$<x<1\times10^{-4}$ mol/mol;

$1\times10^{-4}$ mol/mol$<z<1.5\times10^{-1}$ mol/mol;

$0<a<0.2$ mol/mol; and wherein $2\leq\alpha<3$ and $2<\beta\leq5$.

34. A photostimulable phosphor panel according to claim 33, wherein metals selected from the group consisting of Li, Na, K, Tl, Ca, Ba, Pb, Ni, Cr, Cu, Fe and Bi are additionally present.

35. A photostimulable phosphor panel according to claim 33, wherein in the formula (1') europium is present in an amount in the range between 40 and 500 p.p.m. (μmol/mol) vs. CsBr.

36. A photostimulable phosphor panel according to claim 33, wherein in the formula (1') europium is present in an amount in the range between 40 and 200 p.p.m. (μmol/mol) vs. CsBr.

37. A photostimulable phosphor panel comprising a photostimulable phosphor according the formula (2')

$$Cs_{(1-z-\alpha a-\beta x)}Rb_zBr_{(1-y)}Cl_y:aEu.xTa \quad (2'),$$ wherein $1\times10^{-5}$ mol/mol$<x<1\times10^{-4}$ mol/mol;

$6\times10^{-4}$ mol/mol$<y<1.5\times10^{-2}$ mol/mol;

$1\times10^{-4}$ mol/mol$<z<1.5\times10^{-1}$ mol/mol, $0<a<0.2$ mol/mol;

and wherein $2\leq\alpha<3$ and $2<\beta\leq5$.

38. A photostimulable phosphor panel according to claim 37, wherein metals selected from the group consisting of Li, Na, K, Tl, Ca, Ba, Pb, Ni, Cr, Cu, Fe and Bi are additionally present.

39. A photostimulable phosphor panel according to claim 37, wherein in the formula (2') europium is present in an amount in the range between 40 and 500 p.p.m. (μmol/mol) vs. CsBr.

40. A photostimulable phosphor panel according to claim 37, wherein in the formula (2') europium is present in an amount in the range between 40 and 200 p.p.m. (μmol/mol) vs. CsBr.

* * * * *